United States Patent [19]

Hulett et al.

[11] 3,925,781

[45] Dec. 9, 1975

[54] DIGITAL MODULATION GENERATOR WITH CYLINDRICAL ANTENNA ARRAY SYSTEM

[75] Inventors: James S. Hulett, Canoga Park; Lowell N. Shestag, Woodland Hills, both of Calif.

[73] Assignee: Emerson Electric Co., St. Louis, Mo.

[22] Filed: Oct. 5, 1973

[21] Appl. No.: 403,997

[52] U.S. Cl. .................. 343/106 R; 343/100 SA
[51] Int. Cl.² .................................. G01S 1/44
[58] Field of Search ...... 343/106 R, 100 R, 100 CS, 343/100 SA; 325/38 R

[56] References Cited
UNITED STATES PATENTS

| | | | |
|---|---|---|---|
| 3,046,547 | 7/1962 | Begovich | 343/100 R |
| 3,055,001 | 9/1962 | Ricketts | 343/106 R |
| 3,242,494 | 3/1966 | Gicca | 343/100 R |
| 3,474,446 | 10/1969 | Shestag et al. | 343/100 SA |
| 3,772,597 | 11/1973 | Stover | 325/38 R |
| 3,774,214 | 11/1973 | Toman et al. | 343/106 R |

*Primary Examiner* — Maynard R. Wilbur
*Assistant Examiner* — T. M. Blum
*Attorney, Agent, or Firm* — Edward A. Sokolski

[57] ABSTRACT

An antenna array for the TACAN navigational guidance system has a plurality of cylindrically arranged antenna elements. Each element is excited with a modulated radio frequency signal, the modulation pattern for each such element having a predetermined phase relationship with reference signals. The modulation signal for all antenna elements are stored in digital form in a memory which may comprise a "read only" memory. The memory is digitally addressed to successively provide outputs in binary coded form, these outputs representing the modulation signal for each of the antenna elements in sequence. The outputs of the memory are converted to analog form to provide modulation signals for each of the antenna elements in incremental steps.

15 Claims, 9 Drawing Figures

| CLOCK N° | D/A CONV. ADDRESS | MEMORY ADDRESS | |
|---|---|---|---|
| 0 | 0 | 0° | |
| 36 | 0 | 1° | |
| 72 | 0 | 2° | |
| 108 | 0 | 3° | |
| 144 | 0 | 4° | ONE PERIOD |
| ⋮ | | | |
| 12888 | 0 | 358° | |
| 12924 | 0 | 359° | |
| 12960 | 0 | 0° | CYCLE REPEATS |

| CLOCK N° | D/A CONV. ADDRESS | MEMORY ADDRESS | |
|---|---|---|---|
| 0 | 0 | 0° | |
| 1 | 1 | 10° | |
| 2 | 2 | 20° | |
| 3 | 3 | 30° | |
| 4 | 4 | 40° | |
| ⋮ | | | |
| 34 | 34 | 340° | |
| 35 | 35 | 350° | |
| 36 | 0 | 1° | |
| 37 | 1 | 11° | |
| 38 | 2 | 21° | |
| ⋮ | | | |
| 358 | 34 | 349° | |
| 359 | 35 | 359° | ONE |
| 360 | 0 | 10° | COMPLETE |
| 361 | 1 | 20° | PERIOD |
| 362 | 2 | 30° | |
| ⋮ | | | |
| 12922 | 34 | 339° | |
| 12923 | 35 | 349° | |
| 12924 | 0 | 359° | |
| 12925 | 1 | 9° | |
| 12926 | 2 | 19° | |
| ⋮ | | | |
| 12958 | 34 | 340° | |
| 12959 | 35 | 350° | |
| 12960 | 0 | 0° | |
| 12961 | 0 | 10° | CYCLE REPEATS |

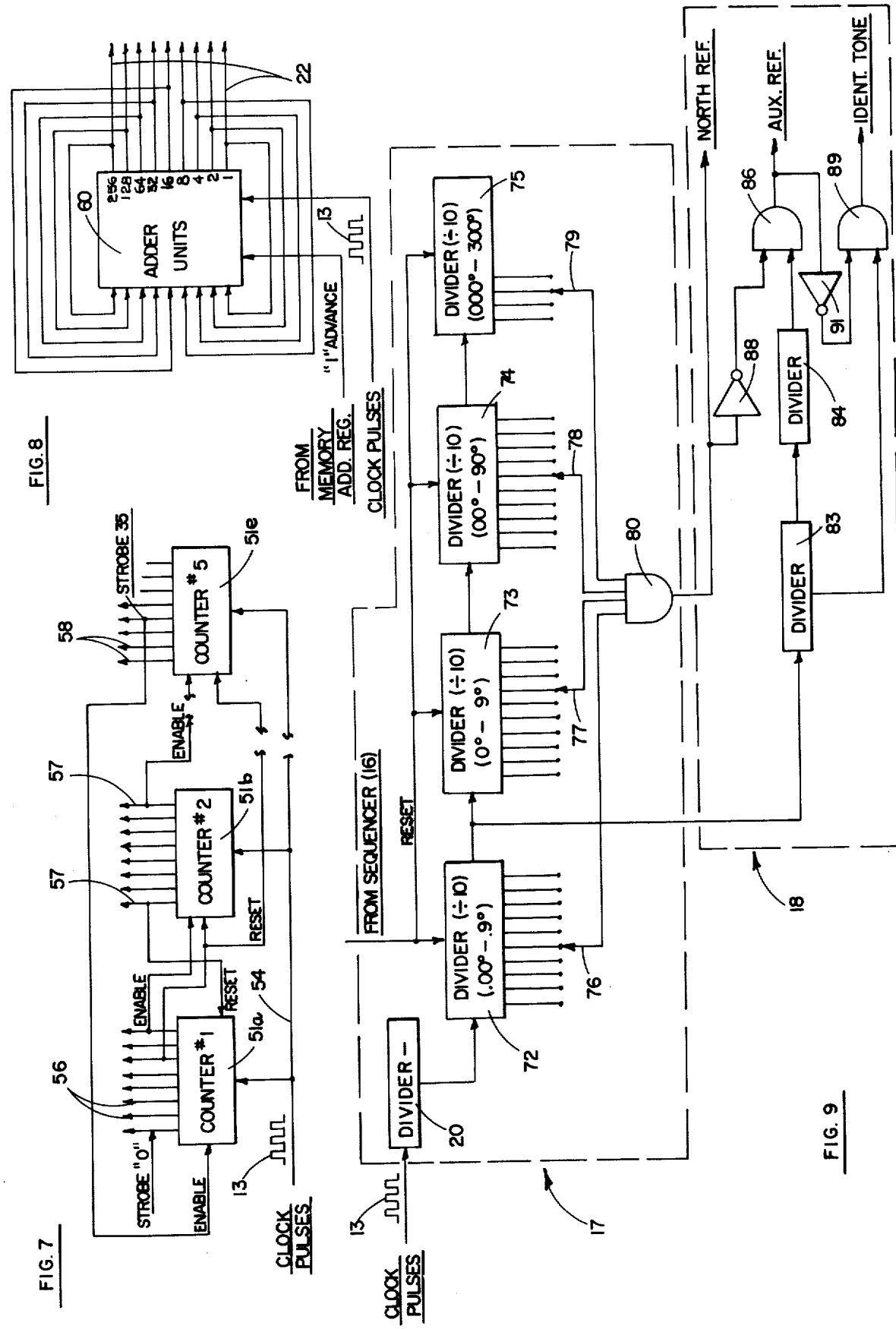

DIGITAL MODULATION GENERATOR WITH CYLINDRICAL ANTENNA ARRAY SYSTEM

This invention relates to navigational antenna systems, and more particularly to a digital modulation generator for such a system.

In U.S. Pat. No. 3,474,446, an electronically modulated cylindrical array antenna system is described which is suitable, for utilization with the TACAN navigational guidance system. In this system, the characteristic TACAN radiation pattern is achieved by utilizing a separate phase shifting circuit for each of the elements in the array, these phase shifting circuits employing resistive circuits which receive quadrature related signals and derive therefrom signals for modulating the emission from the various antenna elements having the desired phase relationships.

This analog implementation has several disadvantages. First, the circuitry is subject to phase variations with temperature changes and variations in power supply voltages which leads to inaccuracies in the operation of the system. Further, the analog implementation of the prior art, as described in the aforementioned patent, utilizes a substantially greater number of components and is more expensive to fabricate than the digital implementation of the present invention.

The system of the present invention overcomes the aforementioned shortcomings of prior art analog implementations in that it is substantially insensitive to temperature and voltage variations and has a higher inherent accuracy. In the system of the invention, voltage variations cause only percent modulation change, not modulation phase change, which can reduce navigational accuracy, as is the case with systems of the prior art. Also, the frequency and phase accuracy is that of inherently stable crystal oscillators that are typically 10 to 100 times better than analog RC filter circuits. Further, the system of this invention tends to have higher reliability of operation. As already noted, the digital implementation of the present invention utilizes less components than the devices of the prior art and has a lower cost of fabrication. Further, the digital implementation of the present invention lends itself to self-testing much more readily than analog implementations of the prior art.

It is therefore an object of this invention to provide a more accurate and reliable modulation system for a navigational antenna system.

It is a further object of this invention to provide a modulation system for a navigational antenna system of lower cost and utilizing less components than prior art modulation systems.

Other objects of this invention will become apparent as the description proceeds in connection with the accompanying drawings, of which:

FIG. 7 is a functional block diagram illustrating a sector address register which may be utilized in the system of the invention.

FIG. 8 is a functional block diagram illustrating a memory address sequencer which may be utilized in the system of the invention; and FIG. 9 is a functional block diagram illustrating circuitry which may be utilized to generate the reference signals and the identification tone in the system of the invention.

Briefly described, the system of the invention is as follows: A memory, which may be in the form of a "read only memory" (ROM), contains in digital binary coded form the modulation pattern for the cylindrical antenna array. An address code is provided for the memory to successively read out the bits of information in the desired sequence by means of a memory address sequencer. The memory address sequencer is controlled by synchronizing clock pulses from a highly stable crystal controlled clock pulse generator as well as a "1 advance" signal provided thereto form a sector address register for each complete antenna element address cycle. The sector address register successively enables a storage register for each of the antenna elements while these storage registers are successively receiving the outputs of the memory. The appropriate memory outputs coinciding with corresponding sector addresses are thus successively fed from each storage register to a digital-analog converter for each such register. The digital-analog converters convert the digitally coded signals to analog from and provide their analog outputs to the associated antenna elements. In this manner, each antenna element is modulated with an incremental signal in accordance with the appropriate modulation pattern therefor, the modulation patterns for the various elements being phase shifted with respect to each other by the action of the memory address sequencer and sector address register.

Figures 1, 3, 4:
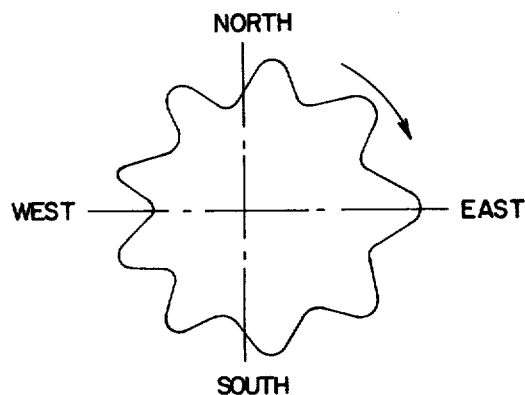
FIG. 1 illustrates a typical antenna radiation pattern for the system with which the present invention is utilized.
FIG. 3 is a table illustrating the modulation program for the system of the invention.
FIG. 4 is a further table illustrating the modulation program of the system of the invention.

Referring now to FIG. 1, the radiation pattern of a system modulated by the modulator of the invention is illustrated. This radiation pattern is for the TACAN navigational guidance system and is a gear-shape pattern having nine nodes and nine antinodes. The pattern as shown is for one preselected instant during the modulation cycle, the amplitude of each point on the pattern varying sinusoidally in accordance with the modulation signals.

Figure 2:
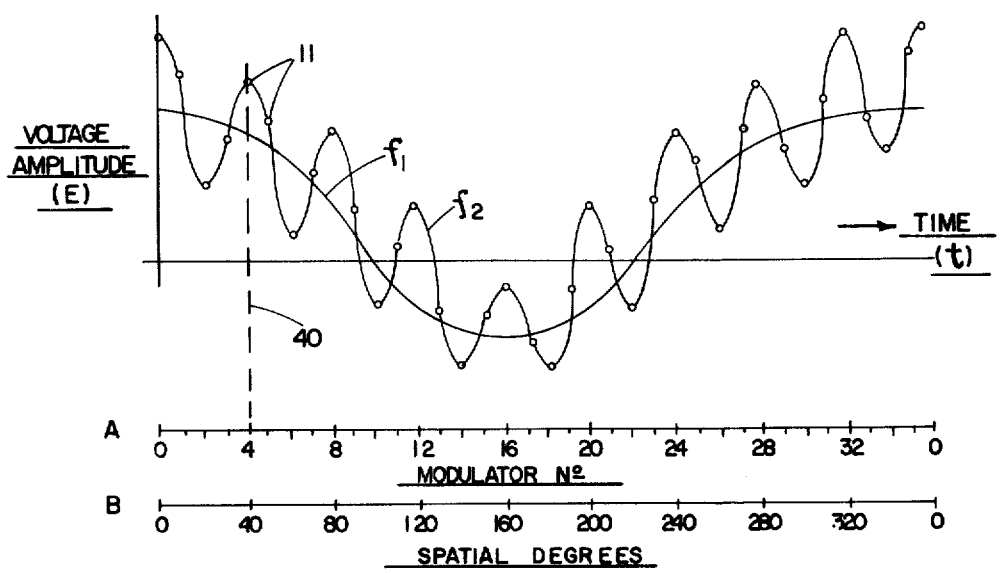
FIG. 2 illustrates a typical modulation pattern generated by the system of the invention.

Referring now to FIG. 2, the details of a typical modulation signal for each of the antenna elements is illustrated. For 36 cylindrically arranged antenna elements, each such element receives a signal modulated as indicated in FIG. 2, but phase shifted from the previous element by 10°. The modulation signal is a composite of a first signal, $f_1$, at a lower frequency which may be 15 hertz, and a second signal, $f_2$, at a higher frequency which may be 135 hertz. The two signals are modulated on the RF carrier of the radio transmitter which is typically at UHF frequencies. For convenience of illustration, the amplitudes for each 10° interval in the complete modulation cycle are indicated by dots 11 (spatial degrees indicated in line B). For 36 antenna radiating elements, these dots also represent the instantaneous amplitudes of the outputs of each such antenna element at a given instant in time, as shown in line "A" of the Figure.

Figure 5:
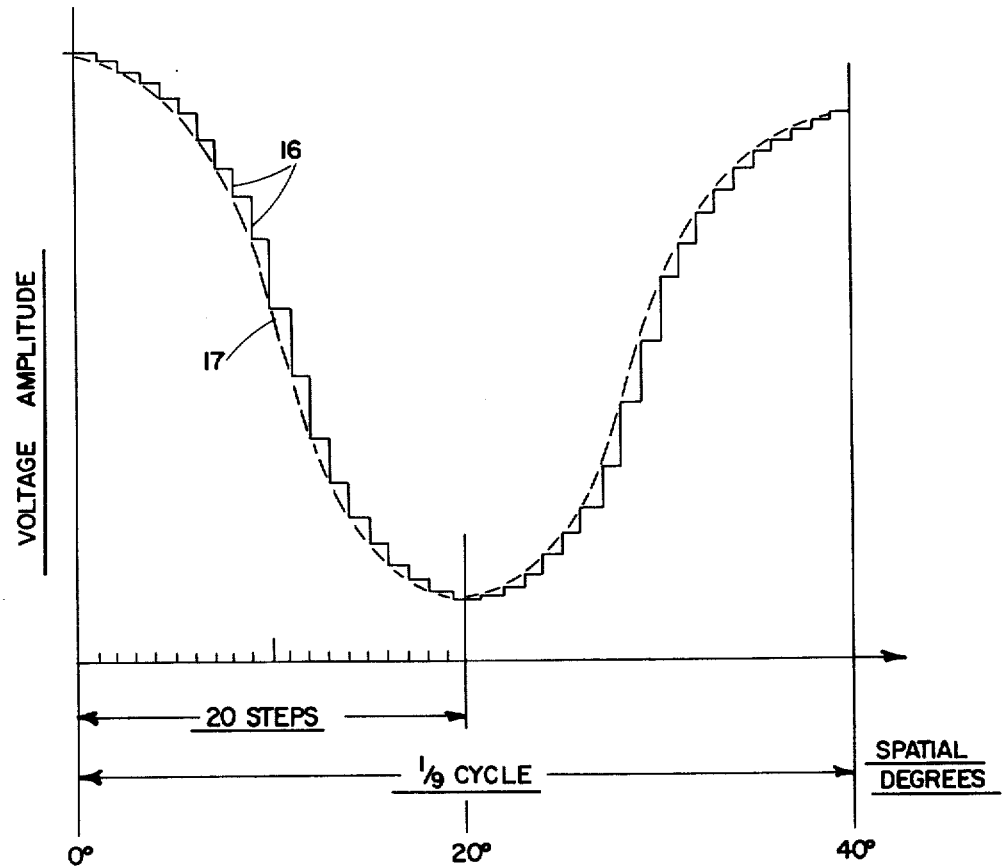
FIG. 5 is a graph illustrating the digital synthesis of the modulation pattern in the system of the invention.

Referring now to FIG. 5, the digital synthesis of the modulation pattern of FIG. 2 is illustrated. The portion of the modulation signal shown in FIG. 2 between the start of the cycle and dotted line 40 is illustrated in FIG. 5. As shown in FIG. 5, the signal is synthesized from digital increments 16 to form the modulation pattern. The digitally synthesized signal can be readily filtered to produce the smooth curve indicated by dotted line 17.

Figure 6:
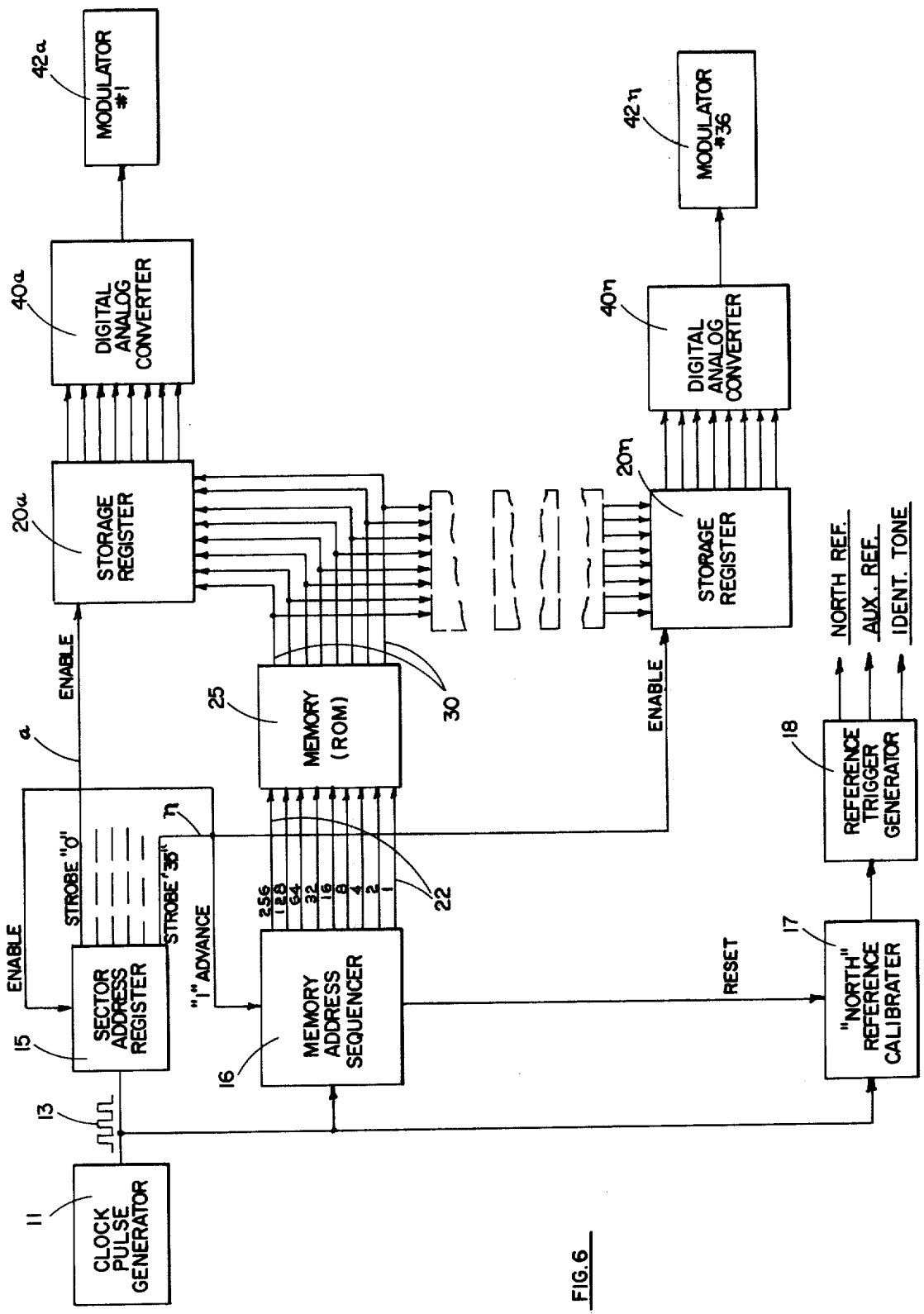
FIG. 6 is a functional block diagram illustrating a preferred embodiment of the system of the invention.

Referring now to FIG. 6, a preferred embodiment of the invention is schematically illustrated. Clock pulse generator 11 generates a series of clock pulses 13, which for the preferred embodiment may be at a frequency of 54 kilohertz. Clock pulses 13 are simultaneously fed to sector address register 15, memory address sequencer 16, and "north" reference calibrator 17.

Sector address register, as to be described more fully in connection with FIG. 7, may comprise a plurality of counter units arranged in series to provide 36 "strobe" pulse outputs in sequence on output lines $a-n$ in succession. When the last strobe pulse appears on line $n$, it serves as an enable pulse to reinitiate the counting cycle of the register.

"Strobe" signals on lines $a-n$ are each fed to an associated storage register $20a-20n$ respectively, each of the strobe pulses providing an enable signal for its associated storage register. For the preferred embodiment of FIG. 6, it should be apparent that there are 36 storage registers (one for each of the strobe outputs of the sector address register).

Memory address sequencer 16 may comprise a plurality of adder units which add in fixed steps (10°) in synchronism with the clock pulse inputs thereto and provide an output on lines 22 of this count in binary coded form. This count is modified, however, for each count cycle of sector address register 15 by the addition of a "1" count thereto. Thus, each time strobe "35" appears on line "$n$", the output count of the memory address sequencer is advanced by "1".

The binary coded output of memory address sequencer 16 is fed to memory 25 as an address therefor. Memory 25 may comprise a "read only" memory (ROM). This type of memory, as is well known in the art, may be formed by integrated circuit techniques and has permanently stored therein a large number of individual signal values in binary coded form. For each digitally coded input address, the memory provides a different digitally coded output from the information stored therein. In the example of FIG. 6, the memory is shown to have an 8-bit digital output. The output lines 30 of memory 25 are fed in parallel to each of storage registers $20a-20n$, as inputs thereto. The storage registers, however, are successively enabled by the strobe signals fed thereto on lines $a-n$ respectively. Thus, each storage register will only accept an input when it is receiving its associated enabling pulse. In this manner, synchronization is achieved between the memory read out and the sector address register outputs, such that signals are provided from each storage register to correspond to the appropriate signals stored in the memory.

This operation can be better appreciated by reference to FIGS. 3 and 4, which are tables illustrating the address signals for various clock pulse inputs. As can be seen in FIG. 3, the first 36 clock pulses provide addresses to the memory which cause outputs from the memory in digitally coded form corresponding to signal amplitudes at 0° of the modulation cycle, and succeeding 10° intervals of such cycle. For each succeeding 36 clock pulses (i.e., with succeeding cycles of the sector address register), the outputs of the memory are for a 1° increment over the preceding address register cycle, but again at 10° intervals over the modulation cycle. This continues until one complete period of the modulation cycle has been completed, after which the cycle repeats itself.

FIG. 4 illustrates the 1° advancement in the signal that occurs for each 36 clock pulses, in this instance, such advancement being shown for the "0" address. Thus it should be apparent that signals stored in memory 25 for each incremental amplitude of the modulation signal for each modulator can be read out in succession from the memory and fed to the appropriate modulator.

The outputs of each of storage registers $20a-20n$ are fed to an appropriate one of digital/analog converters $40a-40n$, where they are converted from digital to analog form. The analog outputs of the digital/analog converters are each fed to an associated one of modulators $42a-42n$ for use in applying modulation signals to the radio frequency energy radiated by each of the antenna elements. It is further to be noted that each modulator modulates the output signal through a full 360° of the modulation cycle, with the outputs of successive modulators being phase shifted from each other by 10° of the modulcation cycle. Thus, as shown in FIG. 4, the first modulator successively receives signals having incremental amplitudes for each 1° interval of the modulation cycle.

In a navigational system such as TACAN, reference signals are required, these signals being radiated by all of the antenna elements and being utilized at the reception point for phase comparison with the signals received from the antenna elements covering the sector in which the vehicle is located. It is essential that these reference signals be accurately calibrated. Clock pulses 13 are fed to "north" reference calibrator 17, which, as to be described in connection with FIG. 9, can be calibrated to provide an output pulse having a time of occurrence accurately representing a "north" reference. The operation of the "north" reference calibrator is synchronized by means of a reset signal fed thereto from the memory address sequence at the start of each cycle thereof. The output of "north" reference calibrator 17 is fed to reference trigger generator 18 which generates trigger pulses providing references for both the modulation signal indicated by $f_1$ and that indicated by $f_2$ in FIG. 2, the latter of these being referred to as an "auxiliary" reference. Reference trigger generator also is utilized to generate an identification tone which is modulated on the RF carrier for each of the antenna elements. This tone is utilized to identify the particular transmission station and may be of the order of 1350 hertz. The circuitry for the "north" reference calibrator 17 and reference trigger generator 18 are described fully further on in the specification in connection with FIG. 9.

Referring now to FIG. 7, circuitry which may be utilized for implementing sector address register 15 is shown. The circuitry comprises five counters (only three shown) $51a-51e$. The counters are driven by clock pulses 13 fed thereto on line 54. Each counter is driven successively in response to the clock pulses when an enable signal arrives at the input thereto. Thus, as can be seen, counter No. 1 is enabled by "strobe" 35 and is driven so that its output lines 56 successively have output signals thereon in response to successive clock pulse inputs 13 until the eighth such output pulse occurs, this eighth output pulse enabling counter No. 2 so that it in turn may go through a similar count cycle. The first output line 57 of counter No. 2 is connected to provide a reset signal for counter No. 1, so that when its count has been completed counter No. 1 is reset for a new count. Similarly, the last output 57 of counter No. 2 is utilized to enable counter No. 3 (not shown) with a reset signal being provided from the third counter to reset counter No. 2. The last used output 58 (output No. 4) of counter No. 51e is used to provide the enable signal for counter No. 1. A reset signal for counter Nos. 2–5 is provided from the sixth output of counter No. 1. In this manner the 36 "strobe" outputs are repetitively provided in succession in response to the clock pulses.

Referring now to FIG. 8, a circuit which may be utilized for the memory address sequencer 16 of FIG. 6 is schematically illustrated. The memory address sequencer comprises adder units 60 which add a fixed number (e.g. 10) to the memory address register whenever clock pulses 13 are fed thereto and provide an output on lines 22 in digitally coded form indicative of the required signal phase. This end result may be accomplished by maintaining the binary "2" and "8" input lines in their "ON" states at all times. An extra "1" count input is provided to the adder at the end of each count cycle of sector address register 15 (each 36 count), as described in connection with FIG. 6. This, as already explained, advances the count for each antenna element modulator in 1° increments as shown in FIG. 4. The adder includes a reset circuit to provide recycling of the count at the end of each count of 360.

Referring now to FIG. 9, circuitry which may be utilized for implementing "north" reference calibrator 17 and reference trigger generator 18 is shown. Clock pulses 13 are fed to divider 70, the output of divider 70 being fed to divider 72. Dividers 72, 73, 74 and 75 each divide the input fed thereto by 10, divider 73 receiving the output of divider 72 as its input, divider 74 receiving the output of divider 73 as its input, and divider 75 receiving the output of divider 74 as its input. The outputs of divider 75 represent 0° – 300° increments, the outputs of divider 74 represent 0° – 90° in 10° increments, the outputs of divider 73 represent 0° – 9° in 1° increments, and the outputs of divider 72 represent 0.0° – 0.9° in 1/10° increments. The dividers are reset by a signal from the memory address sequencer at the start of each cycle of operation of the system. Selector switches 76–79 are provided for each of dividers 72–75 respectively, for selecting one of the outputs thereof in calibrating the equipment. The selector switches 76–79 are connected to AND gate 80 which provides an output signal representing "north" reference, with the simultaneous arrival at the AND gate of signals from all of the dividers.

The system is calibrated by manually setting the selector switches until the output signal of AND gate 80 is such as to provide proper operation of the antenna system as compared with bearing readings provided from a known bearing reference source. The calibration of a TACAN system in this manner is well known in the art and therefore need not be discussed in detail here.

Dividers 83 and 84 are utilized to divide down the output of divider 72 to provide an auxiliary reference signal to AND gate 86. This signal, as already mentioned is utilized for calibrating the higher frequency modulation signal used ($f_2$). The output of AND gate 80 is inverted by means of inverter 88, this inverted signal being fed to AND gate 86 to inhibit the operation thereof when the "north" reference signal is present. The output of divider 83 which is at a suitable audio frequency (e.g., 1350 hertz), is fed to AND gate 88 to provide a tone signal used in identifying the transmission station. The transmission of the tone is inhibited by means of a signal fed from AND gate 86 to inverter 91. This signal prevents the transmission of the identification tone when the auxiliary reference signal is present and also when the "north" reference signal is present, in view of the fact that the transmission of the auxiliary reference is inhibited during such time.

The system of this invention thus provides a highly accurate and reliable means for generating TACAN type radio navigation signals. The digital approach utilized not only is inherently more accurate than prior art analog approaches, but also utilizes substantially less parts and lends itself to more economical and compact construction.

While the system of this invention has been described and illustrated in detail, it is to be clearly understood that this is intended by way of illustration and example only and is not to be taken by way of limitation, the spirit and scope of this invention being limited only by the terms of the following claims.

We claim:

1. A modulation generator for generating a plurality of modulation signals for successively separately modulating the radio frequency signals radiated by individual elements of an antenna array, comprising:

a digital memory having stored therein binary coded digital signals representing a series of incremental modulation signals for modulating the signals radiated by each of said antenna elements, means for addressing said memory to provide successive outputs in binary coded form, said outputs representing the modulation signal associated with each of said antenna elements in sequence, separate storage register means for receiving the outputs of the memory associated with each of said antenna elements respectively, digital-analog converter means for converting the outputs of each of said register means to analog form, addressing means including means for successively enabling each of said storage register means to provide outputs therefrom in sequence to associated ones of said digital analog converter means, and modulator means for generating a modulation signal for the radio frequency signals radiated by each of said antenna elements, said modulator means each receiving the output of a respective one of said digital-analog converter means and operating in response thereto.

2. The modulation generator of claim 1 wherein said addressing means comprises a clock pulse generator, a sector address register responsive to the clock pulse output of said clock pulse generator for cyclically generating a series of address pulses, each of the address pulses in every cycle being fed as an enable signal to a separate one of said register means, a memory address sequencer for generating a binary coded digital output in response to the outputs of said clock pulse generator and one of the address pulses in each cycle of the sector address register output.

3. The modulation generator of claim 1 wherein said digital memory is a read only memory.

4. The modulation generator of claim 2 and additionally including reference signal generator means responsive to the clock pulse output for generating at least one reference signal for modulating the radio frequency signals radiated by all of the elements of the array.

5. The modulation generator of claim 2 wherein said sector address register comprises a counter providing successive count outputs in response to the clock pulse output of the clock pulse generator.

6. The modulation generator of claim 2 wherein said memory address sequencer comprises an adder which adds a predetermined fixed number in synchronism with the clock pulses fed thereto and advances its count in response to said one address pulse in each cycle of the sector address register output.

7. A modulation generator for generating a plurality of modulation signals for successively separately modulating the radio frequency signals radiated by individual elements of an antenna array comprising:
a digital memory having stored therein binary coded digital signals representing a series of incremental modulation signals for modulating the signals radiated by each of said antenna elements,
a clock pulse generator for generating a series of clock pulses,
sequencer means responsive to the output of said clock pulse generator for providing an address for said memory to cause said memory to read out signals representing the modulation signal for each of said elements in sequence,
a storage register for each of said antenna elements, each of said storage registers receiving the output of said memory,
address register means for cyclically providing an enabling pulse to each of said storage registers in succession in response to the clock pulse output of said clock pulse generator, said address register means providing an advance signal to said sequencer means to advance the address thereof for each cycle of the address register means,
digital/analog converter means for converting the outputs of each said storage register to analog form, and modulator means responsive to the outputs of each of said converter means for providing a modulation signal for each of said antenna elements.

8. The modulation generator of claim 7 wherein said digital memory is a read only memory.

9. The modulation generator of claim 7 wherein said address register means comprises a counter for providing successive counts on its output lines in response to the clock pulses in cyclical fashion, the count for each cycle of said counter corresponding to the number of elements in said antenna array.

10. The modulation generator of claim 7 wherein said sequencer means comprises an adder which adds a fixed count to its output for each clock pulse fed thereto and provides an output in binary coded form representing this count plus the advance signal fed thereto.

11. The modulation generator of claim 7 and additionally including reference signal generator means responsive to said clock pulses for generating at least one reference signal for modulation on the radio frequency signals radiated by all of the elements of the array.

12. The modulation generator of claim 11 wherein said reference signal generator means comprises a reference calibrator for receiving said clock pulses and selectively providing reference output pulses having a time of occurrence corresponding to a desired reference.

13. The modulation generator of claim 12 wherein said reference calibrator comprises a plurality of serially connected dividers, selector switch means for selecting outputs of said dividers and AND gate means for receiving the outputs of said switch means and providing said output pulses when the outputs of said selector switch means are in time coincidence.

14. The modulation generator of claim 13 wherein said reference signal generator means further comprises a reference trigger generator for generating a tone signal, and an auxiliary reference signal synchronized with said reference pulses but at different frequencies therethan.

15. The modulation generator of claim 14 wherein said reference trigger generator further includes logical gating means for inhibiting the generation of said tone signal and said auxiliary reference signal when said reference pulses are present.

* * * * *